March 2, 1965
J. McORLLY
3,171,947
ELECTRIC HEATER ASSEMBLIES
Filed Jan. 21, 1960
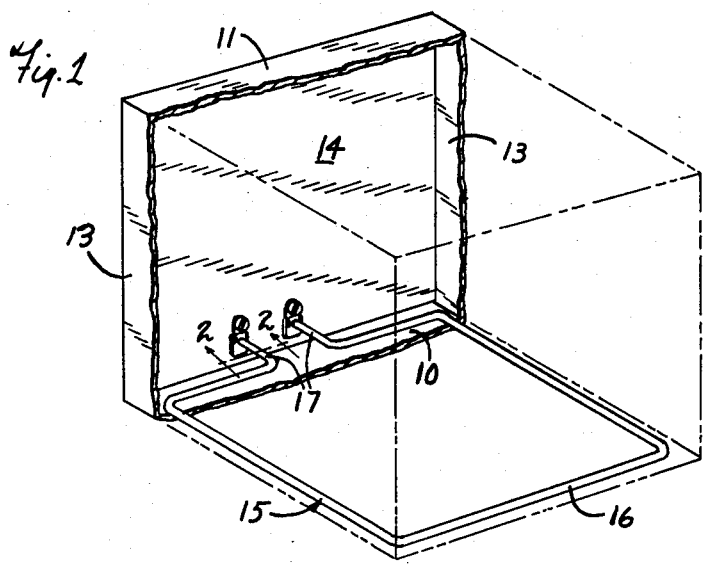
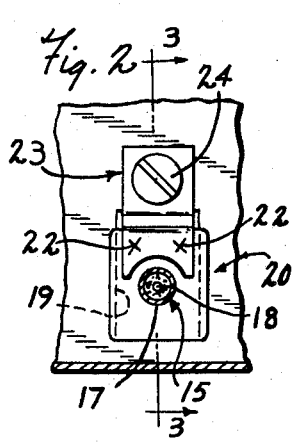
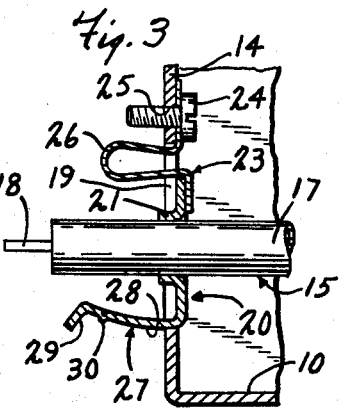
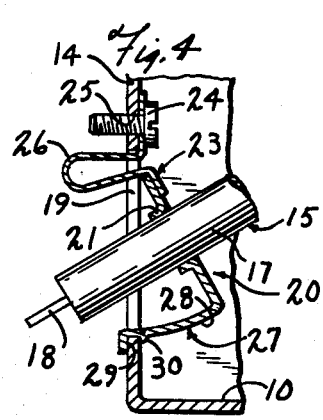
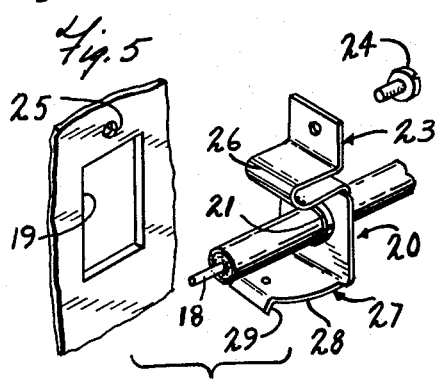
INVENTOR.
Joseph McOrlly
BY
Attorney

United States Patent Office 3,171,947
Patented Mar. 2, 1965

3,171,947
ELECTRIC HEATER ASSEMBLIES
Joseph McOrlly, Wilkinsburg, Pa., assignor to Edwin L. Wiegand Company, Pittsburgh, Pa.
Filed Jan. 21, 1960, Ser. No. 3,919
6 Claims. (Cl. 219—404)

The present invention relates to electric heater assemblies, more particularly to an assembly especially adapted for use in heating the oven compartment of a domestic electric range, and the principal object of the invention is to provide new and improved assemblies of such character.

The ovens of most present-day domestic electric ranges utilize, for heating purposes, a tubular, metallic-sheathed, electric resistance heating element which is disposed within the oven adjacent its lower wall. To facilitate cleaning of the oven interior, the element assembly of many constructions provides for pivoting of the element up and away from the oven lower wall.

While many of these prior art constructions were more or less satisfactory in normal use, they have been objectionable for one or more of the following reasons: Firstly, many of the prior art constructions have been expensive to manufacture and therefore their selling price has been high. Secondly, while the installation of many prior art constructions would appear to be rather simple, such simplicity is more apparent than real when there is considered the space limitations under which the installation must be made. Thirdly, many constructions fail to provide the convenience of a "stand-up" feature whereby the element may be shifted away from the oven lower wall for cleaning of the latter, the element remaining in spaced relation with such lower wall, without further attention, until such time as the cleaning is finished and the element is intentionally returned to its normal position adjacent the oven lower wall. Fourthly, some prior art constructions were rather fragile in nature and failed to stand up under hard use.

The present invention has none of the foregoing disadvantages and also provides other advantages which will appear from a study of the following description:

In the drawing accompanying this specification and forming a part of this application there is shown, for purpose of illustration, an embodiment which the invention may assume, and in this drawing:

FIGURE 1 is a fragmentary perspective view of an oven, showing the present invention associated therewith, FIGURE 2 is an enlarged, fragmentary sectional view generally corresponding to the line 2—2 of FIGURE 1, FIGURE 3 is a further enlarged, fragmentary sectional view generally corresponding to the line 3—3 of FIGURE 2, FIGURE 4 is a view similar to FIGURE 3 but with certain parts shown in another position, and FIGURE 5 is an exploded perspective view of the parts seen in FIGURES 2 through 4.

With reference to FIGURE 1, there is fragmentarily shown an oven of an electric range having a lower wall 10, an upper wall 11, side walls 13, 13, and a rear wall 14. Although not shown, the front of the oven is adapted to be closed by a suitable door.

For the purpose of heating the interior of the oven, there is presently employed an elongated, tubular sheathed, electric resistance heating element 15 of the usual type having an intermediate heat-generating portion 16 and terminal end portions 17 for conducting electrical energy to the heat-generating portion. Although not shown because the construction of such elements is well-known in the art, it is to be understood that a suitable resistor conductor is disposed wthin the tubular sheath intermediate its ends to provide the heat-generating element portion and suitable conductor pins 18 (see FIGURE 3) are electrically connected to respective resistor conductor ends and project beyond the sheath ends for connection to a source of electrical energy. As in the usual construction, the tubular sheath will be filled with compacted, electric-insulating heat-conductive material which embeds and thus immobilizes the terminal pins and the resistor conductor. In the present construction, the heat-generating element portion has a rectangular configuration to generally conform to the configuration of the lower wall of the oven and the terminal ends of the element are disposed in side-by-side relation to project through the rear wall of the oven as will later appear.

As herein disclosed and in the normal heating position of the element 15, its heat-generating portion 16 extends generally parallel with the lower wall 10 and is spaced slightly thereabove with the terminal ends 17 of the element projecting through respective openings 19 (see especially FIGURE 5) formed in the rear wall 14. The means provided for pivotally securing each element terminal end 17 to the rear wall 14 of the oven is as follows, it being understood that a description of but one such end is necessary since an identical construction is employed for each.

Secured to each element terminal end in spaced relation to its free end is a sheet metal flange 20 which is apertured to pass the element terminal end. For a purpose to appear, such flange is of a size slightly wider than the width of the wall opening 19 to in part overlie and cover the latter but of less height than the aperture. While any suitable means may be employed to secure the flange to the element, it is preferred to so form the flange aperture to provide on its rear face an integral annular ring 21. Such ring will be deformed radially inwardly into gripping engagement with the element to thus structurally integrate the element and the flange.

Projecting marginally of flange 20 and preferably secured thereto by spot welds 22 (see FIGURE 2), is a spring metal strip 23. In the present embodiment, strip 23 projects from the upper margin of the flange 20 and is of a width slightly narrower than the wall opening 19. The free, upper end of the strip is apertured to pass a fastening screw 24 which is threaded into an aperture 25 formed in the rear wall 14 of the oven above the wall opening 19. An intermediate portion of strip 23 is formed to provide a loop or corrugation 26 which projects transversely of the flange through the wall opening 19. Corrugation 26 extends generally parallel to the rear wall 14 and functions to increase the flexibility of the strip for a purpose to appear.

With the construction thus far disclosed, it will be understood that the flange 20 is secured to the wall 14 by means of the spring strip 23 thus providing a flexible connection therebetween about which the flange is pivotable about an axis adjacent to and generally parallel to the strip corrugation 26 from the position seen in FIGURE 3 to the position seen in FIGURE 4. It will also be understood that the corrugation in the strip increases the length of the strip portion available for deflection as the flange is moved as above described and therefore increases the flexibility of the strip and reduces the stress imposed thereon by such flange movement.

Returning now to the flange 20, the lower margin of the latter has a structurally integral, transversely projecting tongue 27 extending through the wall opening 19. Tongue 27, of course, is of a width slightly less than that of the wall opening so as to freely pass therethrough. As best seen in FIGURES 3 and 4, tongue 27 has an arcuate configuration generated about the axis about which the flange 20 is pivotable to provide a downwardly facing arcuate surface 28 for engaging the lower defining margin of the wall opening 19. The free end of tongue 27 is bent transversely to provide an abutment 29 and the surface 28 of the tongue is provided with a depending protuberance 30 adjacent to but spaced from abutment 29.

While the previously described corrugation 26 has been disclosed as functioning only to increase the flexibility of the spring strip 23, such corrugation serves yet another important function. With the parts assembled as seen in FIGURE 3, the arrangement is such that the spring strip urges flange 20 downwardly in an edgewise direction and yieldably urges tongue surface 28 into engagement with the lower defining margin of the wall opening 19. This resilient engagement of the arcuate tongue with the wall opening provides for smooth pivotal movement of the flange despite the absence in the construction of the usual pivot pin.

When the interior of the oven is to be cleaned, element 15 will be pivoted from its normal position seen in FIGURE 3 wherein its heat generating portion 16 is generally parallel with the lower wall of the oven to the position seen in FIGURE 4 wherein such element portion is spaced from such oven wall. Upon shifting of the element to the position seen in FIGURE 4, it will be noted that the abutment 29 engages behind the rear wall of the oven to limit upward pivotal movement of the element. It will also be noted that with the element thus positioned, protuberance 30 engages the front of the rear wall and retains the element in the position shown without further attention.

When the element is to be returned to the position seen in FIGURE 3, its heat-generating portion need only be pressed downwardly, the flange springing momentarily upwardly, against the edgewide urging of the spring strip 23, to disengage the protuberance from in front of the wall and thus allow the element to swing to its original position. Under certain circumstances, it may be desirable to eliminate the protuberance 30, the frictional engagement, in such case, of the arcuate tongue with the lower defining margin of the wall opening being sufficient to hold the element up for cleaning of the oven interior.

Installation of the present element in the oven is extremely simple since, assuming each terminal pin 18 to be connected to its lead wire, the free ends of the element terminal portions together with the flange tongue 27 of each will be inserted through respective wall openings 19. With each tongue resting upon the lower defining margin of respective wall openings, the element will then be tilted to pass the spring strip corrugation 26 through respective openings. The insertion and tightening of respective screws 24 will complete the assembly operation. Disassembly may as readily be effectuated by reversing the foregoing.

It is to be understood that while a separate flange 20 and its associated parts is shown for each terminal end 17 of the heating element, a single flange could be employed merely by making such flange large enough to extend between the element terminal portions and by forming two apertures therein, one for each element terminal end portion. In such case, a single wall opening would be provided, but of a width to receive both element terminal ends, and but a single spring strip would be necessary, although perhaps of greater width than herein illustrated. Obviously, with a single spring strip, a single screw will be adequate to retain the parts assembled.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A heater assembly for an oven having an interior space defined by joined horizontal and vertical walls, a vertical wall having an aperture therethrough and located adjacent to the junction between said vertical wall and a horizontal wall, a metal-sheathed electric heating element for said oven having a heat generating portion disposed within and adapted to heat the interior of said oven and also having a terminal portion extending from said heat generating portion and adapted to extend through said wall aperture to the exterior of said oven for connection to a source of electrical current, a flat supporting flange having an opening through which said terminal portion passes, the latter being securely fixed to said supporting flange, said supporting flange having a structurally integral spring strip forming a flatwise marginal extension thereof, means for securing said spring strip flatwise against said vertical wall at a defining margin of said wall aperture with said supporting flange overlying at least a part of such aperture, said spring strip providing for pivotal swinging movement of said supporting flange flatwise toward and away from said vertical wall so that the attached heating element may swing vertically toward and away from said horizontal wall, said supporting flange having a tongue forming a marginal extension opposed to the extension of said spring strip, said tongue extending from and at an angle to a side surface of said supporting plate and projecting through said wall aperture, and said tongue being resiliently pressed against an adjoining marginal edge of said wall aperture to frictionally rub thereagainst during swinging movement of said supporting plate.

2. The construction according to claim 1 wherein said tongue has a curvature with a radius generally centered at the point of pivotal swinging movement of said supporting flange whereby it frictionally rubs against said marginal edge during substantially the entire swinging movement of said supporting flange.

3. The construction according to claim 2 wherein said tongue has a protuberance adjacent to its end which snaps behind said vertical wall at said marginal edge to releasably hold said supporting flange against swinging movement in a predetermined direction.

4. A heater assembly for an oven having an interior space defined by joined horizontal and vertical walls, a vertical wall having an aperture therethrough and located adjacent to the junction between said vertical wall and a horizontal wall, a metal-sheathed electric heating element for said oven having a heat generating portion disposed within and adapted to heat the interior of said oven and also having a terminal portion extending from said heat generating portion and adapted to extend through said wall aperture to the exterior of said oven for connection to a source of electrical current, a flat supporting flange having an opening through which said terminal portion passes, the latter being securely fixed to said supporting flange, said supporting flange having a structurally integral spring strip forming a flatwise marginal extension thereof, means for securing said spring strip flatwise against said vertical wall at a defining margin of said wall aperture with said supporting flange overlying at least a part of such aperture, said spring strip having a transversely extending loop portion providing for pivotal swinging movement of said supporting flange flatwise toward and away from said vertical wall so that the attached heating element may swing vertically toward and away from said horizontal wall, said supporting flange having a tongue forming a marginal extension opposed to the extension of said spring strip, said tongue extending from and at an angle to a side surface of said supporting flange and through said aperture and having an abutment engageable with the wall margining said aperture to limit swinging movement of said supporting flange.

5. A heater assembly for an oven having an interior space defined by joined horizontal and vertical walls, a vertical wall having an aperture therethrough and located adjacent to the junction between said vertical wall and a horizontal wall, a metal-sheathed electric heating element for said oven having a heat generating portion disposed within and adapted to heat the interior of said oven and also having a terminal portion extending from said heat generating portion and adapted to extend through said wall aperture to the exterior of said oven for connection to a source of electrical current, a flat supporting flange having an opening through which said terminal portion passes, the latter being securely fixed to said supporting flange, said supporting flange having a structurally integral spring strip forming a flatwise marginal extension thereof, means for securing said spring strip flatwise against said vertical wall at a defining margin of said wall aperture with said supporting flange overlying at least a part of such aperture, said spring strip having a transversely extending loop portion providing for pivotal swinging movement of said supporting flange flatwise toward and away from said vertical wall so that the attached heating element may swing vertically toward and away from said horizontal wall; said supporting flange having a tongue forming a marginal extension opposed to the extension of said spring strip, said tongue extending from and at an angle to a side surface of said supporting flange and through said aperture, said loop portion biasing said supporting flange in a direction toward a marginal edge of said wall aperture to resiliently press said tongue against such edge so that it frictionally rubs thereagainst during swinging movement of said supporting flange.

6. The construction according to claim 5 wherein said tongue has a curvtaure with a radius generally centered at the point of pivotal swinging movement of said supporting flange whereby it frictionally rubs against said marginal edge during substantially the entire swinging movement of said supporting flange, said tongue having an abutment at its free end to engage the front of said vertical wall at said marginal edge and thereby limit swinging movement of said supporting flange outwardly from said vertical wall, and said tongue having a protuberance spaced inwardly of said abutment and which snaps over said marginal edge and engages behind said vertical wall to releasably hold said supporting flange in its outward swung position.

References Cited by the Examiner
UNITED STATES PATENTS

| | | | |
|---|---|---|---|
| 2,356,409 | 8/44 | Keusder | 292—265 |
| 2,507,965 | 5/50 | Eichner | 16—150 |
| 2,918,560 | 12/59 | Kruse | 219—404 |
| 2,955,189 | 10/60 | Fry | 219—463 |

RICHARD M. WOOD, *Primary Examiner.*

MAX L. LEVY, *Examiner.*